Jan. 11, 1938.  W. S. SAUNDERS  2,104,765
BATTERY INSTALLATION
Filed Feb. 20, 1936  3 Sheets-Sheet 1
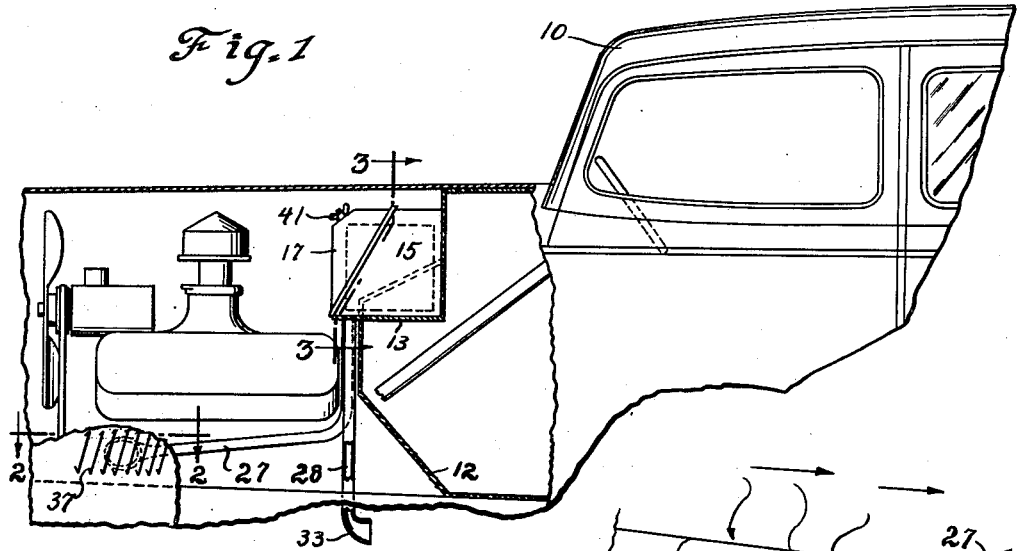
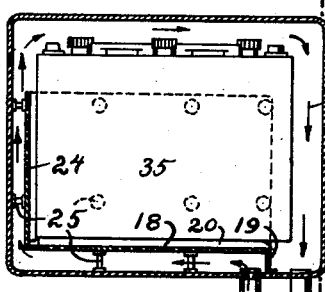
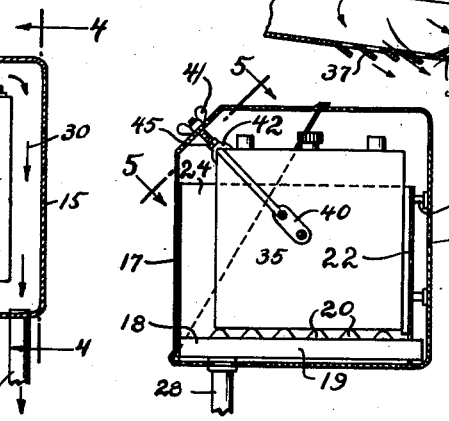
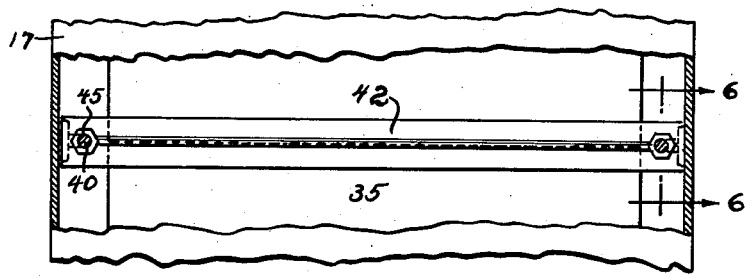
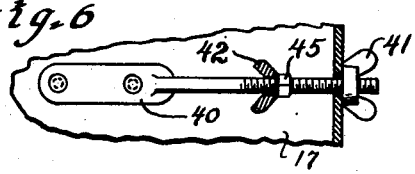
INVENTOR.
Walter S. Saunders
BY
ATTORNEYS.

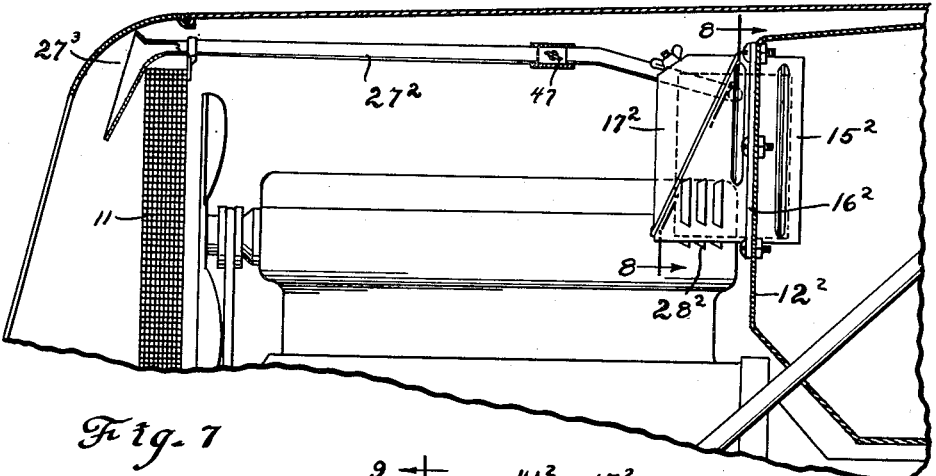
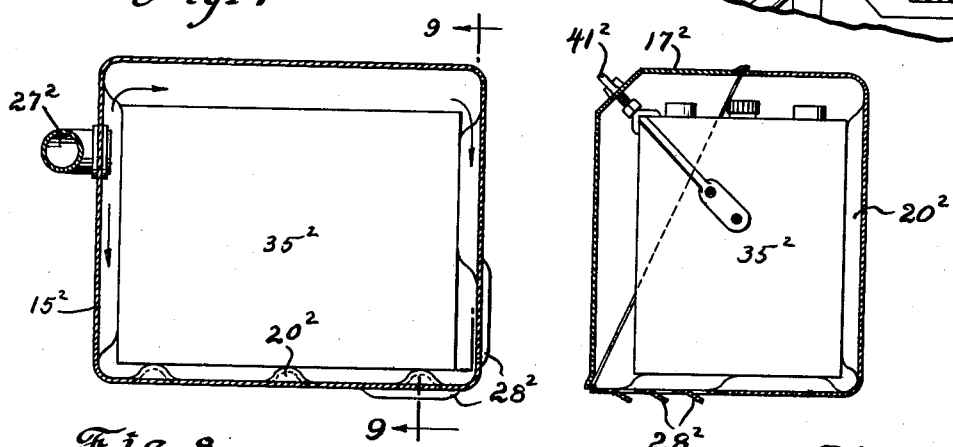
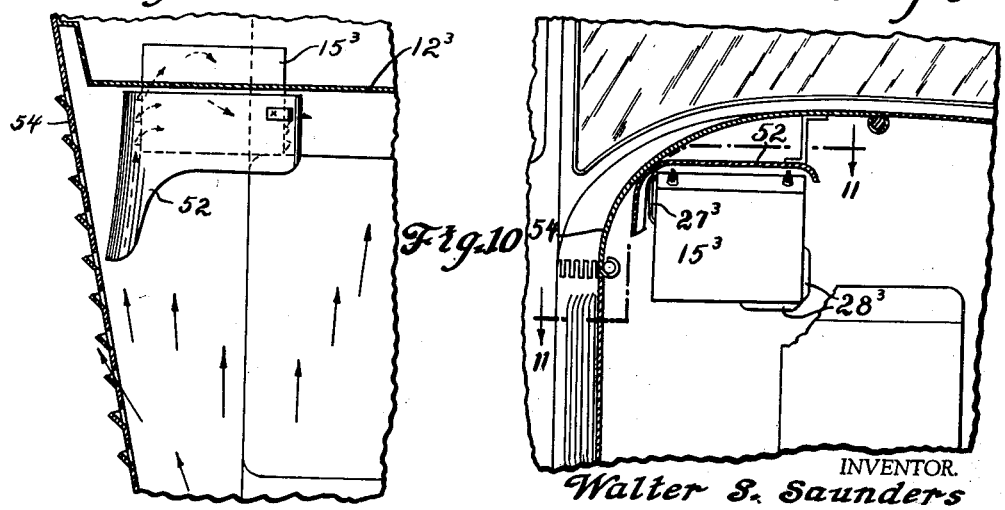

Jan. 11, 1938. W. S. SAUNDERS 2,104,765
BATTERY INSTALLATION
Filed Feb. 20, 1936 3 Sheets-Sheet 3

INVENTOR
WALTER S. SAUNDERS
BY
ATTORNEYS

Patented Jan. 11, 1938

2,104,765

UNITED STATES PATENT OFFICE 2,104,765

BATTERY INSTALLATION

Walter S. Saunders, Pontiac, Mich., assignor to The American Forging and Socket Company, Pontiac, Mich., a corporation of Michigan Application February 20, 1936, Serial No. 64,909

18 Claims. (Cl. 180—68.5)

This invention relates to the installation of storage batteries, and particularly concerns an improved method and structure whereby the storage battery of an automobile may be mounted in a most economical fashion, close to the engine and to the parts to which the most important connections are to be run, yet adequately ventilated and guarded against the injurious effects of the heat developed by the engine.

Since especially heavy and relatively expensive copper power leads must be run from the storage battery to the starter motor and starter switch, it has always been considered desirable to mount the battery in the car as close to the starter motor and switch as possible. Installation of the battery directly in the engine compartment and too close to the engine is undesirable, however, because of the aforementioned injurious effects of heat upon the battery. Common practice has suspended the battery beneath the floor boards, but the tendency of present day development in automobile design is toward lower and lower floor levels, and consequent reduction of clearance between the battery and road until it now approaches the danger point, and accidental injury to the battery is sometimes caused by an obstruction in the road, or by scraping on a deeply rutted road. Since, furthermore, the design trend is such that still lower floor levels may be expected, it becomes imperative to find another location for the battery, yet one which does not entail unduly increased wiring or other installation expense. In accordance with my invention the difficulties mentioned are overcome, and other advantages secured, by mounting the battery close to the engine, housed in a separate compartment of its own, and arranging for ventilation by novel means by which fresh air is taken from a point ahead of the engine, (and preferably also ahead of the radiator) and passed through the battery box in a fashion which insures adequate cooling of the battery and sweeps away and dilutes the acid fumes, thereby greatly reducing the corrosion which these fumes tend to cause.

Another important object contemplates most efficient use of space and materials, in such fashion that a large part of the battery box is formed integrally with the dash paneling, with consumption of little or no more material, considering the installation in its entirety, than present practice requires.

Other objects include the provision of improved ventilating and housing means for storage batteries, and novel holding means acting both to retain the lid of the battery box and clamp the battery in place.

Other objects and advantages will be apparent from the following description, wherein reference is made to the accompanying drawings illustrating a preferred embodiment of my invention, and wherein similar reference numerals designate similar parts throughout the several views.

In the drawings:

Figure 1 is a fragmentary and somewhat diagrammatic side elevational view of the front portion of an automobile, the hood and body paneling being partly broken away to enable a better showing of the structural arrangement.

Figure 2 is a fragmentary horizontal section upon an enlarged scale, taken on the line 2—2 of Figure 1 and looking in the direction of the arrows.

Figure 3 is a vertical section of the battery box, taken as indicated by the line 3—3 of Figure 1, and looking in the direction of the arrows.

Figure 4 is a cross section thereof showing the battery in end elevation, taken substantially on the line 4—4 of Figure 3 and looking in the direction of the arrows.

Figure 5 is a detail section of the battery clamping means, taken substantially on line 5—5 of Figure 4, and looking in the direction of the arrows.

Figure 6 is a further detail thereof taken substantially on the line 6—6 of Figure 5, and looking in the direction of the arrows.

Figure 7 is a view similar to Figure 1 of a somewhat modified construction.

Figure 8 is a vertical section taken substantially on the line 8—8 of Figure 7 and looking in the direction of the arrows.

Figure 9 is a section taken substantially on the line 9—9 of Figure 8, and looking in the direction of the arrows.

Figure 10 is a somewhat diagrammatic vertical sectional view taken through the hood portion of an automobile equipped with my invention showing another somewhat modified form.

Figure 11 is a plan view of the installation corresponding to a section taken substantially on the line 11—11 of Figure 10 and looking in the direction of the arrows.

Figure 12:
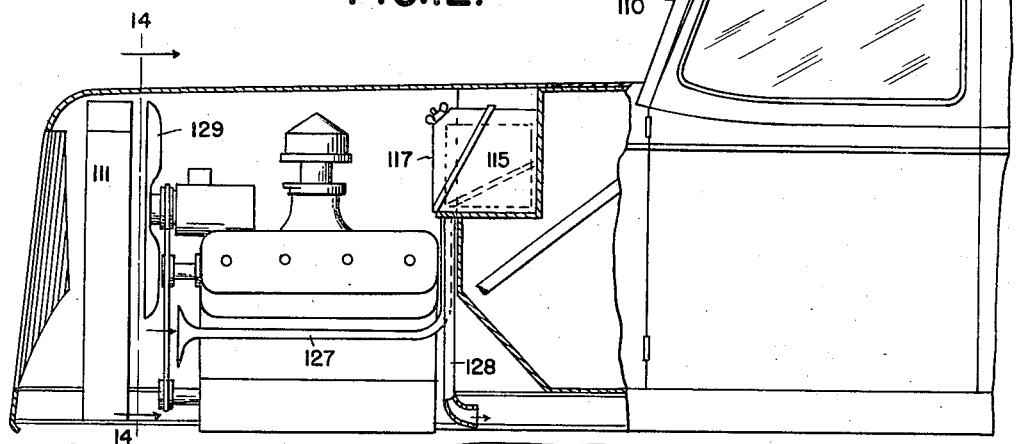
Figure 12 is a view similar to Figure 1 of a somewhat modified embodiment.

Referring now to the drawings: Reference character 10 designates the body, 12 the dash of an automobile of the sedan type, in conjunction with which an illustrative showing of a battery installation made in accordance with my invention is incorporated, although it will be recognized that the type of vehicle is virtually immaterial to the practice of the invention, which may readily be accommodated to different vehicle constructions. The sheet metal dash is pressed inward above the steering column to provide a horizontal shelf 13, which may also define a portion of the body of the battery box, designated 15. The box projects somewhat from the front of the dash above the engine, and may be welded or otherwise directly secured to the dash, and is provided with a cover 17 joining the same upon an oblique plane and forming the front and a portion of the top of the box. The floor of the box carries a false bottom 18 raised thereabove and ribbed as at 20 to provide channels beneath the battery 35. Inner or false back and side walls 22, 24 respectively also somewhat space the battery from the back and end, these walls being similarly ribbed to provide air passages from top to bottom between them and the battery. Ribs 20 will be seen to run lengthwise of the box. The false bottom 18 and end wall preferably extend the full depth of the box from the front to back and are formed integrally to provide continuous air passage between diagonally opposite top and bottom corners of the box. False bottom 18 stops short of one end of the box, and the chamber thereunder is closed by a downwardly bent flange as 19, welded to the floor. Spacing supports 25 are provided to rigidly hold the inner walls and floor in desired relation, and an air inlet conduit 27 enters the space beneath the false bottom at one end of the box, an air outlet conduit 28 being provided at the same end of the box in the portion not covered by the false bottom and accordingly communicating with the open space within the box. Air convection is induced in the manner generally indicated by the arrows 30, entering air being discharged upwardly from one end of the box through the flue provided by the false end wall 24, and traveling over the top and down the sides of the box, through the passages between the ribs, and out the conduit 28, all sides of the battery 35 being thus swept by the air currents.

The air inlet tube 27 is extended forward to a position near the louvers 37 calculated to catch a portion of the air stream which flows along the louvered panel. The arrangement of the inlet end of conduit 27 is best shown in Figure 2. Certain of the louvers, as 37', may open inwardly adjacent the mouth of tube 27 to assist the induction. The exhaust air conduit 28 extends downwardly to a point somewhat below the frame and is turned back, as at 33, so that the entraining effect of the air flowing beneath the car provides an ejecting action increasing the convection.

The studs 40 by which the cover is held in place are secured to the side walls of the box, and extend angularly upwardly and through the cover, the threaded extremities accommodating wing nuts 41 by which the cover is held. Also supported by the studs 40 is a length of angle iron 42 adapted to engage the upper front corner of the battery to clamp it in place, the angle iron being held by nuts 45, also carried by the studs.

In the modified construction shown in Figures 7, 8 and 9, the vertical dash $12^2$ is pierced to receive the battery box $15^2$, formed entirely separately and provided with a holding flange $16^2$ allowing the same to be secured in place by means of nuts and bolts, or the like. The cover portion $17^2$ and battery $35^2$ are similarly held and clamped in place by equivalent parts, which have been given like reference numerals throughout, distinguished by the exponent "2", and most of which need no further description. The battery, in this construction, is spaced from the floor and walls of the box by ribs $20^2$, those in the floor extending from front to back, while those on the side and end walls run vertically. All of the ribs stop short of the corners, to allow for longitudinal air travel. The box is louvered as at $28^2$ to provide the air outlet, such louvers being arranged at the front of the box and near one end only, while the air inlet discharges into the box near the upper rear and diagonally opposite corner. The air inlet extends forward and over the top of the radiator 11 of the car and may be provided with a flared mouth $27^3$ adapted to catch a portion of the advancing air stream. Such mouth may also, as shown, extend downwardly in front of the radiator to a position in which stronger air currents may be intercepted. The air outlets $28^2$ lie directly in the path of the air stream directed over the engine and downward and backward under the dash and floorboards, and open in the direction of the airflow, so that an aspirating or ejecting action tends to draw the air from the box and assist the flow. A butterfly valve or damper 47 may be arranged in the inlet tube to enable closing off or reducing the circulation when desired.

In the somewhat modified construction shown in Figures 10 and 11, the battery box $15^3$ is of similar form to that of the embodiment last described, and may be installed in the dash $12^3$ in like fashion. Inlet and outlet louvers $27^3$—$28^3$ are provided in the box and arranged similarly to the inlet and outlet portions $27^2$—$28^2$. The inlet louvers $27^3$, facing forwardly, (or against or toward the approaching air stream) tend to scoop into the box air from the stream flowing over the motor, while the outlet louvers $28^3$ open and discharge in the same direction as the air stream, and are so disposed that the air flow tends to assist the drawing of air from the box.

In order to augment the air flow and assist the delivery of air to the louvers $27^3$, shrouding as 52 may be arranged to overlie the inlet louvers and the upper and one side of the box, projecting downwardly and forwardly to direct the air stream thereinto, in the manner indicated in Figure 11. The shroud 52 may be supported from the engine hood 54, as indicated in Figure 10, in such fashion that when the hood is raised the shroud is lifted clear of the battery box, from which the cover and battery may then easily be removed.

Figure 13:
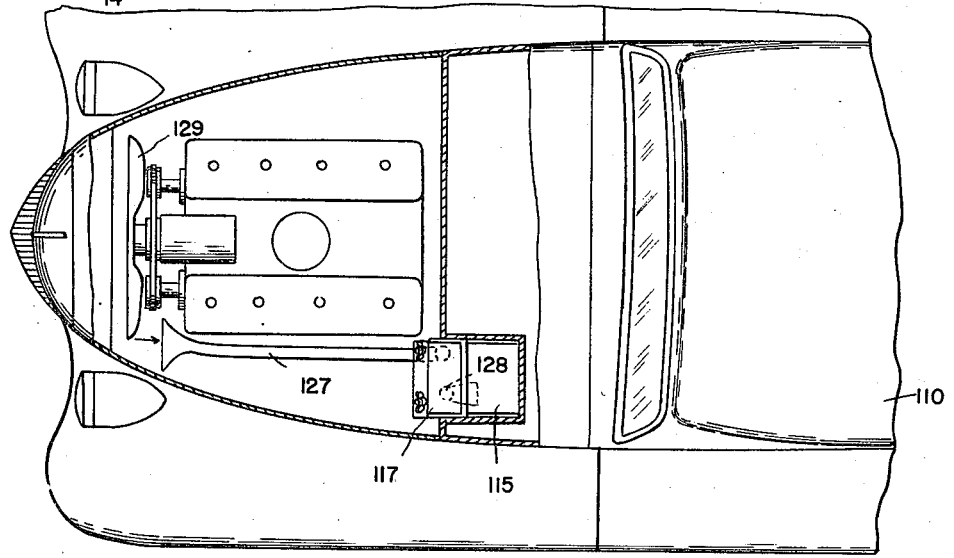
Figure 13 is a plan view thereof, with the hood broken away.
Figure 14:
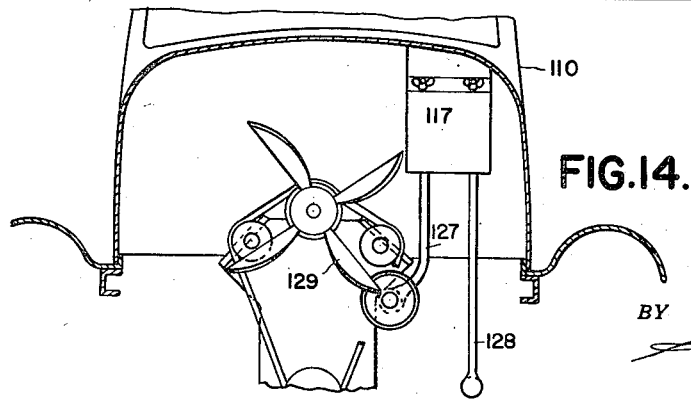
Figure 14 is a vertical section taken substantially on the line 14—14 of Figure 12 and looking in the direction of the arrows.

In the somewhat modified embodiment shown in Figures 12, 13 and 14, the general arrangement of parts will be seen to be similar to the disclosure of Figures 1 to 6 inclusive, analogous parts, accordingly being designated by like reference characters 100 integers higher.

In this embodiment the air inlet tube 127 extends forwardly from the bottom of the box to a point located below and behind the cooling fan 129, where it is provided with a belled mouth into which air is adapted to be driven by the fan. It will be noted that the tube 127 is located at a point near the bottom of the radiator 111, so that although the air entering the inlet tube passes through the radiator, it passes only through that portion of the radiator which remains coolest, despite which, positive air induction is provided by the blast of the fan. The air outlet tube 128 similarly extends downwardly to a point in the air stream beneath the vehicle, where its rearward opening assists the ejecting action of the air flow past its mouth.

While it will be apparent that the illustrated embodiments of my invention herein disclosed are calculated to adequately fulfill the objects and advantages primarily stated, it is to be understood that the invention is susceptible to variation, modification and change within the spirit and scope of the subjoined claims.

What I claim is:

1. In combination with an automobile incorporating electrically operable devices and having an engine compartment, a passenger compartment, and a dash panel separating said compartments, said engine compartment having an engine therein which develops heat in operation, and a radiator ahead of the engine, a storage battery for supplying current to said electrically operable devices carried by the dash panel close to the engine, a casing surrounding said battery, means within the casing for spacing the battery from the walls of the casing, and ventilating means for the battery including an air inlet conduit connected thereto and having an inlet located ahead of the radiator, and an air outlet discharging outside the passenger compartment.

2. In combination with an automotive vehicle incorporating electrically operable elements and having an engine compartment, a passenger compartment, and a dash panel separating said compartments, said engine compartment having an engine therein which develops heat in operation, a storage battery for supplying current to said electrically operable elements, supporting means on the dash for carrying said battery in a position in which it projects into both compartments and adjacent the engine, partitioning means separating the battery from the passenger compartment, and ventilating means for the battery including an air conduit having an inlet located ahead of the engine and discharging air over said battery.

3. In combination with an automotive vehicle incorporating electrically operable elements and having an engine compartment, a passenger compartment, and a dash panel separating said compartments, said engine compartment having an engine therein which develops heat in operation, and a radiator ahead of the engine, a storage battery for supplying current to said electrically operable elements, supporting means on the dash for carrying said battery in a position in which it projects into both compartments and adjacent the engine, casing means enclosing the battery, and ventilating means for the battery including an air conduit having an inlet located ahead of the radiator and discharging into said casing, said casing having an air outlet outside the passenger compartment, and means spacing the battery from the walls and the floor of the casing.

4. In combination with an automotive vehicle incorporating electrically operable elements and having an engine compartment, a passenger compartment, and a dash panel separating said compartments, said engine compartment having an engine therein which develops heat during operation, a storage battery for supplying current to said electrically operable elements, supporting means on the dash for said battery including a battery box adjacent the engine, ventilating means for the battery including an air conduit discharging into the box and having an inlet ahead of the engine, and an air outlet conduit connected to said box and discharging below the passenger compartment.

5. In combination with an automotive vehicle incorporating electrically operable elements and having an engine compartment, a passenger compartment, and a dash panel separating said compartments, said engine compartment having an engine therein which develops heat during operation, a storage battery for supplying current to said electrically operable elements, supporting means on the dash for said battery including a battry box adjacent the engine, a cover portion for said box forming one wall thereof upon the engine compartment side and joining the body of the box at an angle to the general plane of the dash, common means for securing the cover and the battery with respect to the box, comprising studs projecting angularly from the body of the box through the cover, means securable to the studs outside the cover for holding the latter, and means on the studs inside the cover and separately operable for clamping the battery.

6. In combination with an automobile incorporating electrically operable devices and having an engine compartment, a passenger compartment, and a dash panel separating said compartments, said engine compartment having an engine therein which develops heat during operation, a storage battery for supplying current to said electrically operable devices, means for supporting and ventilating said battery comprising a battery box carried by the dash panel close to the engine, air supply and exhaust means for the box including an air intake conduit extending to the box from a position forward of the engine, means within the box for holding the battery spaced from the walls of the box, and baffling means for directing the air flow within the box around the battery and upon all sides thereof.

7. In combination with an automobile incorporating electrically operable devices and having an engine compartment, a passenger compartment, and a dash panel separating said compartments, said engine compartment having an engine therein which develops heat during operation, a storage battery for supplying current to said electrically operable devices, means for supporting and ventilating said battery comprising a battery box carried by the dash panel close to the engine, air supply and exhaust means for the box including an air intake conduit extending to the box from a position forward of the engine, supporting means within the box for holding the battery spaced from the walls of the box, and baffling means within the box extending between diagonally opposite corners thereof for directing airflow over the top, bottom and sides of the battery.

8. In combination with an automobile incorporating electrically operable devices and having an engine compartment, a passenger compartment, and a dash panel separating said compartments, said engine compartment having an engine therein which develops heat and over which an air stream flows during operation, a storage battery for supplying current to said electrically operable devices, means for supporting and ventilating said battery comprising a battery box mounted on the dash above and close to the engine, a housing enclosing said battery, means for ventilating said housing including an air intake conduit extending to the box and having an inlet arranged to take air which has not passed over the engine, and an air exhaust conduit extending from the box to a position in the air stream of the car and so arranged that the discharge therefrom and so the circulation through the box may be aided by entraining action.

9. In combination with an automobile incorporating electrically operable devices and having an engine compartment, a passenger compartment, and a dash panel separating said compartments, said engine compartment having an engine therein which develops heat and over which an air stream flows during the operation, a storage battery for supplying current to said electrically operable devices, means for supporting and ventilating said battery comprising a battery box mounted on the dash above and close to the engine and enclosing the battery, means for ventilating said box including an air intake conduit extending thereto and having an inlet arranged to take air which has not passed over the engine, said box having an exhaust opening discharging into said air stream, the intake and exhaust openings being so directed relatively to the air stream that airflow through said openings and radiation within the box are assisted by the flow of such stream, and means within the box spacing the battery from the walls thereof, whereby circulating air may pass over all sides of the battery.

10. Apparatus as set forth in claim 9 in which said means for spacing the battery from the interior of the box includes a combined false bottom and baffle member defining an air passage around a portion of the battery and forcing air flowing through the box to travel between diagonally opposite portions thereof and over all sides of the battery.

11. Apparatus as set forth in claim 9 in which said means for spacing the battery from the box includes a combined false wall and baffle element defining an air passage around a portion of the battery forcing air flowing through the box to travel between diagonally opposite portions thereof and over all sides of the battery, and additional spacing means carried by said combined false wall and baffle element for holding the battery clear thereof.

12. In combination with an automobile incorporating electrically operable elements and having an engine compartment, a passenger compartment, a dash panel separating said compartments, means including a movable hood for directing air currents through the engine compartment, a battery box carried by the dash and having air inlet and outlet openings connecting the interior of the box with the space within the engine compartment, and shrouding means for directing air into said inlet opening, said shrouding means being carried by and movable with the hood.

13. In combination with an automobile incorporating electrically operable elements and having an engine compartment, a passenger compartment, a dash panel separating said compartments, means including a hood for directing air currents through the engine compartment, and a battery box carried by the dash and projecting into the passenger compartment, said battery box having air inlet and outlet openings connecting the interior thereof with the space within said engine compartment, and deflecting means adjacent the openings and projecting in such directions with respect to the flow of such air currents as to assist the flow of air therethrough and insure circulation of air through the box.

14. Apparatus as set forth in claim 13 in which said box is closed upon the passenger compartment side, and a cover portion for the box opening on the engine compartment side.

15. Apparatus as set forth in claim 13 including shrouding means for directing air to said inlet opening.

16. Apparatus as set forth in claim 13 in which said hood is movable for access to the engine and battery box, a cover for the battery box opening into the engine compartment, and shrouding means for directing air to said inlet opening, said shrouding means being carried by and movable with the hood.

17. In a battery installation for motor vehicles the combination with the motor hood, radiator and radiator-cooling fan of a vehicle, of a battery beneath the hood, a box receiving the battery and having an air inlet and an air outlet, and a funnel shaped duct communicating with said inlet and extending forwardly in the air delivery path of said fan.

18. In a battery installation for motor vehicles, the combination with the motor hood, radiator and radiator-cooling fan of a vehicle, of a battery beneath the hood, a box receiving the battery and having an air inlet and an air outlet, and a duct communicating with said inlet and extending forwardly in the air delivery path of said fan.

WALTER S. SAUNDERS.